April 7, 1931.   A. LANGSNER   1,799,801
LEVELING INSTRUMENT
Filed Feb. 20 1928
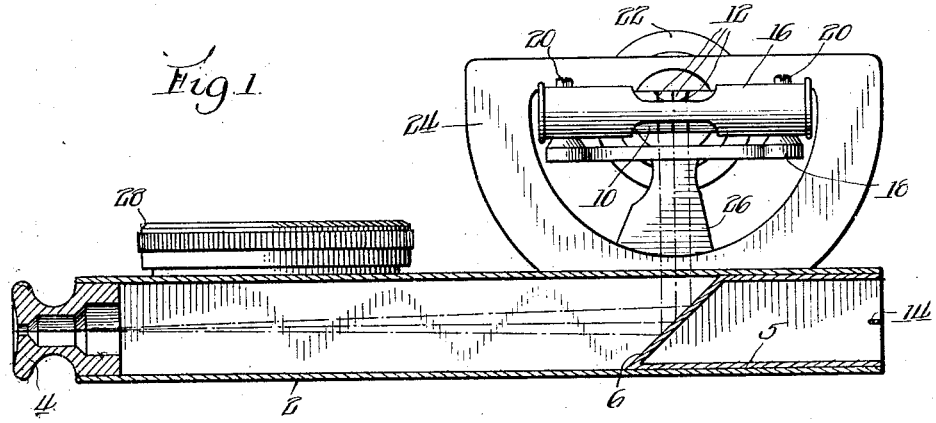
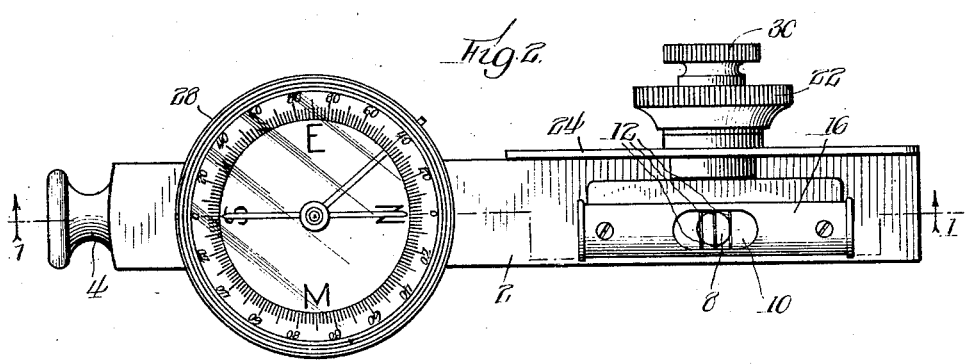
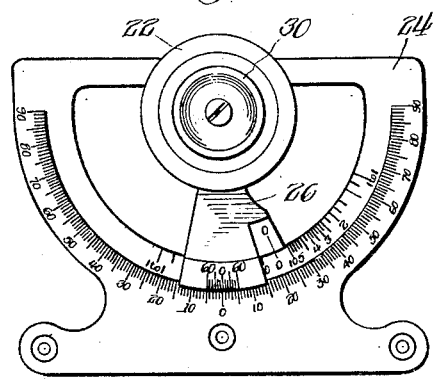
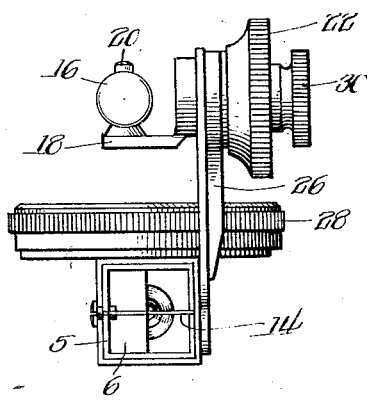
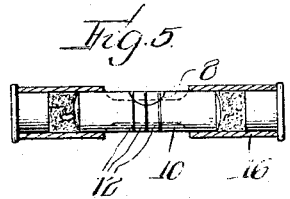
Inventor:
Adolph Langsner,
By Cheever & Cox attys Patented Apr. 7, 1931

1,799,801

UNITED STATES PATENT OFFICE

ADOLPH LANGSNER, OF CHICAGO, ILLINOIS, ASSIGNOR TO EUGENE DIETZGEN COMPANY, OF CHICAGO, ILLINOIS, A CORPORATION OF DELAWARE

LEVELING INSTRUMENT

Application filed February 20, 1928. Serial No. 255,638.

My invention relates to leveling instruments, and more particularly to leveling instruments of the hand or pocket type provided with means for determining the angles of elevation and depression.

Certain of the details of construction of my present invention simulate parts of a leveling instrument disclosed in my copending application, Serial No. 255,635, filed February 20, 1928, but my present invention contemplates the provision of a hand or pocket type of leveling instrument which differs from the instrument of my copending application in that a leveling instrument is provided which may be used to determine the angles of elevation and depression contemporaneously with the determination of the linear distance from the sighting point to the points or stations at which the elevations or depressions are to be determined.

It is an object of my present invention to provide a conveniently and durably constructed leveling instrument of the hand type having a vernier scale for accurately indicating angles of elevation and depression, and having means associated therewith for simultaneously apprizing the observer of the distance of the object sighted from the instrument.

It is a further object of my invention to provide an improved type of spirit level for determining the relative heights of two points, which is equipped with means for determining angles of elevation and depression, and also means including stadia lines for the purpose of accurately indicating the distance of a sighted station from the instrument.

It is still a further object of my present invention to provide a leveling instrument of the hand type having a spirit level mounted upon an arcuate vernier scale and stadia lines associated with the spirit level, means such as a reflecting prism included within the tubular casing of the leveling instrument for reflecting stadia lines to the eye of an observer, and thus when the instrument is sighted upon an object such as a graduated leveling rod, these stadia lines will serve to accurately determine the linear distance of the object from the user simultaneously with the determination of the angle elevation or depression of the line of sight with respect to the position from which the sighting is made.

These and other objects will be apparent from the following detailed description when considered in connection with the accompanying drawings wherein:

Figure 1 is a longitudinal vertical sectional view of the instrument representing one embodiment of my invention taken on the line 1—1 of Figure 2.

Figure 2 is a plan view of the instrument disclosed in Figure 1.

Figure 3 is a detailed side elevational view of the vernier scale.

Figure 4 is an end elevational view of my improved leveling device as viewed from the right, Figure 1, and Figure 5 is a detailed view of the spirit level or vial detached from the vernier scale, the vial casing being shown in section to more clearly disclose structure otherwise hidden.

Referring now to the drawings wherein like numerals have been employed to designate similar parts throughout the figures, it will be observed that Figures 1 and 2 disclose a leveling instrument representing one embodiment of my invention formed with a shell or casing 2, one end of said casing being provided with a suitable eye piece 4. Mounted within the casing 2 at the opposite extremity thereof is a suitable image receiving device 5 having a reflecting surface portion 6, Figure 1. This surface 6 is designed to receive images of a bubble 8 of a spirit level or glass vial 10, and also images of three circumferential lines 12 arranged in parallelism along the peripheral surface of the vial 10. Images thus received by the surface 6 may be readily seen by the observer through the eye piece 4. When the line of sight of the instrument is horizontal and the vial 10 properly positioned, the reflected image of the bubble as viewed by an observer will be bisected by a fine wire or strip 14 extending transversely of the open end of the casing 2. Referring to Figure 4, it will be observed that the reflecting surface 6 occupies substantially half of the cross sectional area of the casing 2, and thus as an observer looks through the eye piece 4 and sights an object, such for example as a graduated rod or leveling staff, (not shown), a clear unobstructed view of the object will be seen through the right half of the casing 2 as viewed in Figure 4. Simultaneously with the observation of the object or graduated scale the images of the stadia lines 12 and the bubble 8 will be seen through the agency of the reflecting surface 6. When the image of the middle line 12 is coincident or in alignment with the strip 14 and the axis of the vial 10 is parallel with the line of sight the instrument will be occupying a truly horizontal position.

A protective casing 16 provides a mounting for the vial 10 as clearly shown in Figure 5. This protective casing 16 is mounted upon a bracket 18, Figures 1 and 4 by means of suitable positioning screws 20 and this bracket 18 is rotatable with the thumb screw 22. The thumb screw 22 is rotatable upon a protractor type vernier scale member 24 which scale member is disclosed in detail in Figure 3. Scale member 24 is suitably secured to the side of the casing 2, and rotatable with the thumb screw 24 is a radial arm 26, the outer extremity of which is provided with graduations which when read in conjunction with the graduations disclosed on the member 24 will serve to accurately indicate the angle between the line of sight and the horizontal, such angles being commonly known as the angles of elevation or depression. Thus it will be understood that when the zero graduation on the radial member 26 is in alignment with the zero graduation on the member 24 as shown in Figure 3, the image of the bubble 8 as viewed upon the reflecting surface 6 will be bisected by the strip 14 if the line of sight of the instrument is horizontal. If the object to be sighted by the observer is elevated from the eye of the observer it will obviously be necessary to incline the line of sight from the horizontal in order to view the object. The thumb screw 22 may then be rotated sufficiently to bring the image of the bubble 8 and the stadia lines 12 into proper relation with respect to the strip or hair line 14. When this hair line bisects the image of the bubble and is coincident with the middle image of the three stadia lines 12, the angle through which the arm 26 has been rotated may be read upon the vernier scale and this angle represents the angle of elevation.

In addition to determining the angles of elevation and depression, my improved leveling instrument is capable of indicating linear distances along the line of sight contemporaneously with the determination of the inclination of the line of sight. This will be readily apparent when it is understood that when the observer sights a graduation on a conventional leveling rod the distance or number of graduations upon the leveling rod which appear to be included between or embraced by the two outermost images of the stadia lines will be proportional to the linear distance of the leveling rod from the position of the observer's eye. Thus, the distance between the outermost stadia lines 12 may be arranged so that when the observer sights a target or scale positioned at a distance of 20 feet, the distance on the scale included between the stadia line images will be equal to one foot. If the same instrument is employed to observe a target placed at a distance 40 feet from the observer, the distance embraced by the stadia line images will obviously be twice as great as the distance observed when the object was positioned at a distance of 20 feet from the observer. From the foregoing it will be apparent that a wide range of spaced relation between the stadia lines might be employed, this relation depending to a large extent upon the type of work for which the instrument is to be used. For the sake of simplicity of disclosure, applicant has shown three stadia lines, but the invention contemplates the arranging and placing of any desired number of these lines, in accordance with the type of work for which the instrument is to be employed. The leveling instruments of the type described are usually provided with a suitable compass 28 to further expedite the use thereof. It will be seen that a locking thumb screw 30 is employed to secure the thumb screw 22 against rotation and thus maintain a fixed relation between the graduations on the arm 26 and the graduations on the member 24 for the purpose of preserving each setting thereof.

The leveling instrument just described presents a very practical and economically constructed device and its practicability is evidenced by its adaptability for use in connection with the leveling of surface areas where the work is to be expeditiously accomplished without the use of the usual type of tripod levels. In using my improved device, the observer may first sight a point on a level rod or staff which is positioned above the ground, a distance equivalent to the height or distance of the leveling instrument from the ground. Then by adjusting the thumb screw 22 the images of the bubble 8 and the stadia lines 12 can be carried into proper alignment with the hair line or strip 14. The angle through which the arm 26 must be moved in order to bring about these conditions will apprize the observer of the angle or number of points of elevation or depression with respect to the object sighted. By observing the distance or the number of graduations upon the leveling rod embraced or included between the outermost stadia line images, the linear distance from the observer to the sighed object may be accurately and quickly determined. Thus it is to be understood that my invention provides a means whereby points or angles of elevation and depression and lineal distances may be simultaneously and accurately ascertained, thereby, greatly facilitating the practical application of hand or pocket type of spirit levels.

I have described features of my invention in connection with a particular type of hand level having stadia lines arranged and spaced in a particular manner in association with an adjustable spirit level, but it is to be clearly understood that my invention is capable of other modifications and applications and should therefore be limited only by the scope of the appended claims.

Having thus described my invention, what I claim as new and desire to secure by Letters Patent is:

1. In a leveling instrument of the class described, a tubular casing, a scale member carried on the casing for measuring degrees of angularity, a spirit level vial angularly movable with one of the scale elements, said vial being provided with a plurality of circumferential stadia lines, and an image receiving means positioned beneath said spirit level which is adapted to bring said stadia lines into apparent view to an observer.

2. In a leveling instrument of the class described, a tubular casing, a scale member carried on the casing for measuring degrees of angularity, a spirit level vial movable with said scale, said vial being provided with a plurality of stadia lines completely encircling the circumference thereof, and a reflector positioned beneath said spirit level vial which is adapted to bring said stadia lines into apparent view to an observer.

In witness whereof, I have hereunto subscribed my name.

ADOLPH LANGSNER.